United States Patent
Charvat

(10) Patent No.: US 7,044,690 B1
(45) Date of Patent: May 16, 2006

(54) METHOD AND APPARATUS FOR REGISTERING A TORQUE-TRANSMITTING TOOL IN A FIXTURE FOR FORMING A DIAGONAL BORE IN THE TOOL

(75) Inventor: George F. Charvat, Lombard, IL (US)

(73) Assignee: JODA Enterprises, Inc., Chicago, IL (US)

( * ) Notice: Subject to any disclaimer, the term of this patent is extended or adjusted under 35 U.S.C. 154(b) by 0 days.

(21) Appl. No.: 10/089,415

(22) PCT Filed: Feb. 1, 2000

(86) PCT No.: PCT/US00/02541

§ 371 (c)(1),
(2), (4) Date: Oct. 30, 2002

(87) PCT Pub. No.: WO00/48777

PCT Pub. Date: Aug. 24, 2000

Related U.S. Application Data

(60) Provisional application No. 60/120,789, filed on Feb. 19, 1999.

(51) Int. Cl.
*B23B 35/00* (2006.01)
(52) U.S. Cl. .................... 408/1 R; 408/37; 408/115 R; 29/26 A; 76/119
(58) Field of Classification Search ................ 408/37, 408/38, 40, 41, 115 R, 115 B, 241 B, 1 R, 408/24, 25, 89, 97; 76/114, 119; 29/26 A, 29/558
See application file for complete search history.

(56) References Cited

U.S. PATENT DOCUMENTS

| | | | |
|---|---|---|---|
| 754,321 A | | 3/1904 | Koeppen |
| 1,369,656 A | * | 2/1921 | Henne et al. .................. 408/40 |
| 1,559,685 A | * | 11/1925 | Douglas ........................ 408/97 |
| 1,593,979 A | * | 7/1926 | Lindquist ..................... 409/297 |
| 1,896,059 A | * | 1/1933 | Wainwright .................. 408/41 |
| 2,353,757 A | * | 7/1944 | Priest, Jr. ................. 408/241 R |
| 2,369,828 A | * | 2/1945 | Humphreys ................... 408/14 |
| 2,462,035 A | | 2/1949 | Carpinella |
| 2,703,994 A | * | 3/1955 | Mezey ......................... 408/40 |
| 3,515,017 A | * | 6/1970 | Ulrich ......................... 408/103 |
| 3,746,459 A | * | 7/1973 | Kindelan ..................... 408/37 |
| 4,712,950 A | * | 12/1987 | Reynolds .................. 408/72 R |
| 5,233,892 A | * | 8/1993 | Roberts .................... 81/177.85 |
| 5,644,958 A | | 7/1997 | Roberts et al. |
| 6,705,808 B1 | * | 3/2004 | Kane ......................... 408/72 B |

FOREIGN PATENT DOCUMENTS

JP 3-281111 * 12/1991

* cited by examiner

*Primary Examiner*—Daniel W. Howell
(74) *Attorney, Agent, or Firm*—Brinks Hofer Gilson & Lione; Gregory H. Zayia

(57) ABSTRACT

A torque transmitting tool is machined by registering the torque transmitting tool using a shoulder between the shank and the out-of-round drive portion of the tool as a reference. First and second seating surfaces are milled on first and second opposed surfaces of the tool, and then first and second bores are drilled into the drive stud, starting from the first and second seating surfaces, respectively. The first and second bores intersect within the drive stud to form a stepped diagonal bore in the tool. Alternately, all machining operations are performed from one side of the tool.

12 Claims, 6 Drawing Sheets

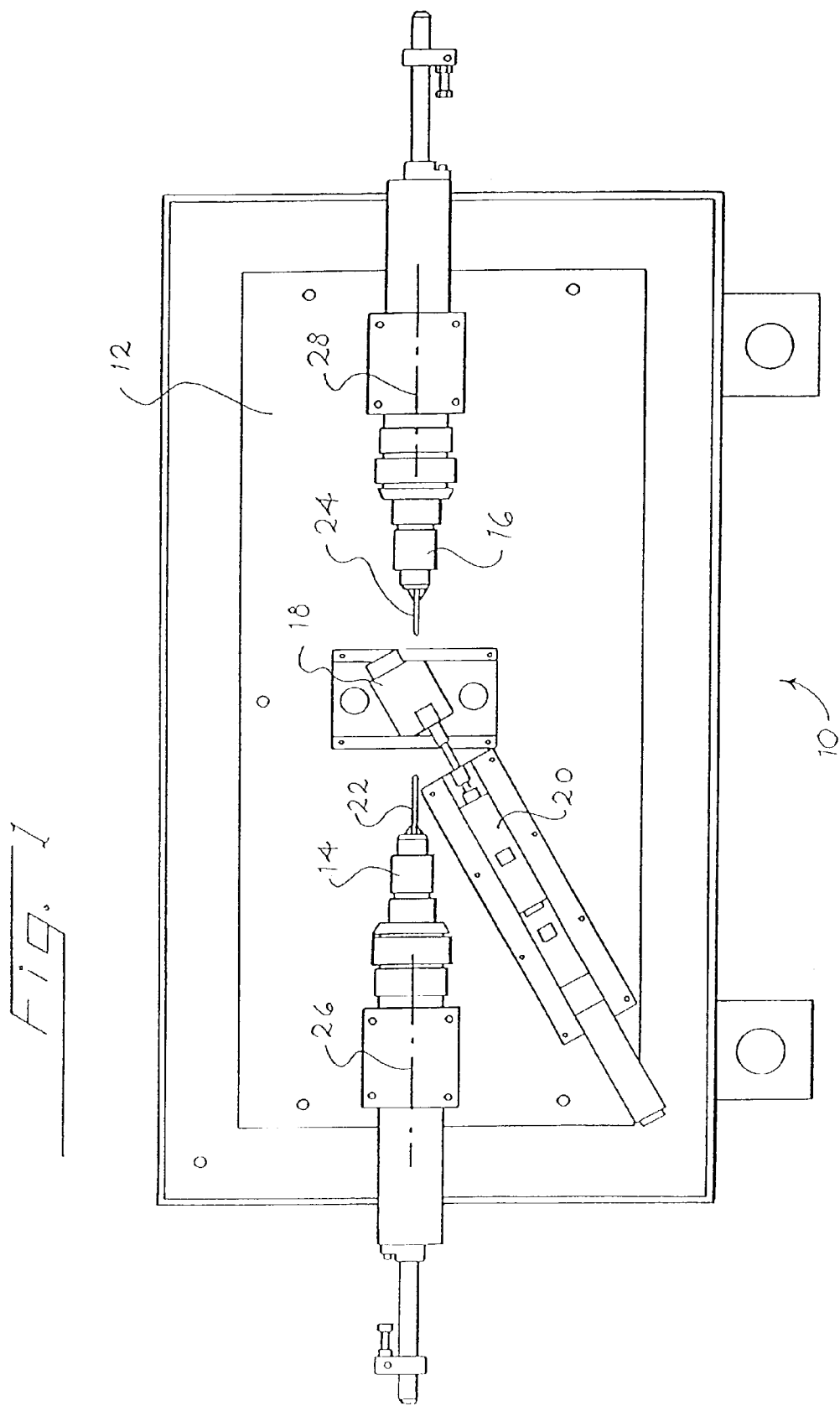

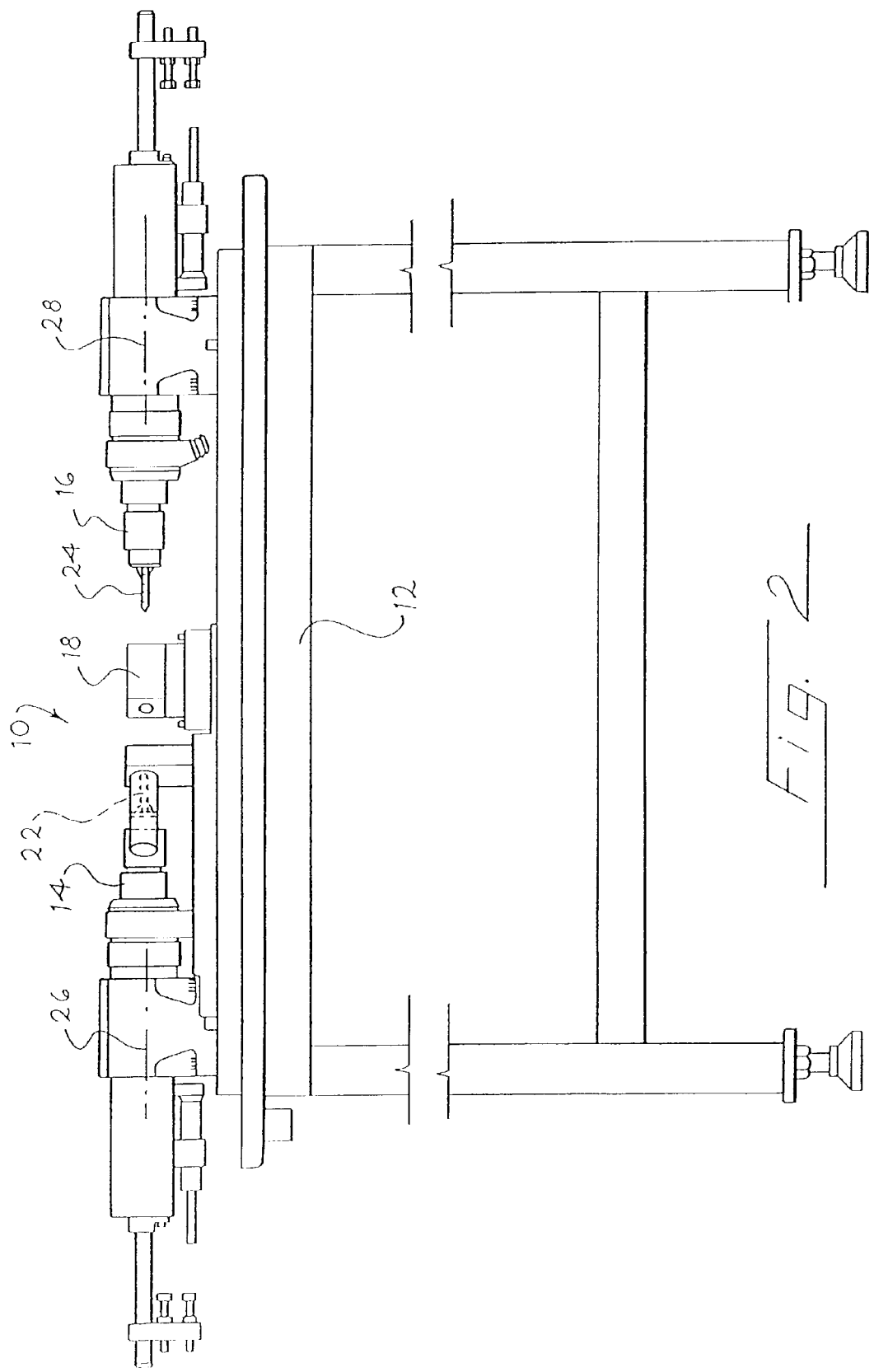

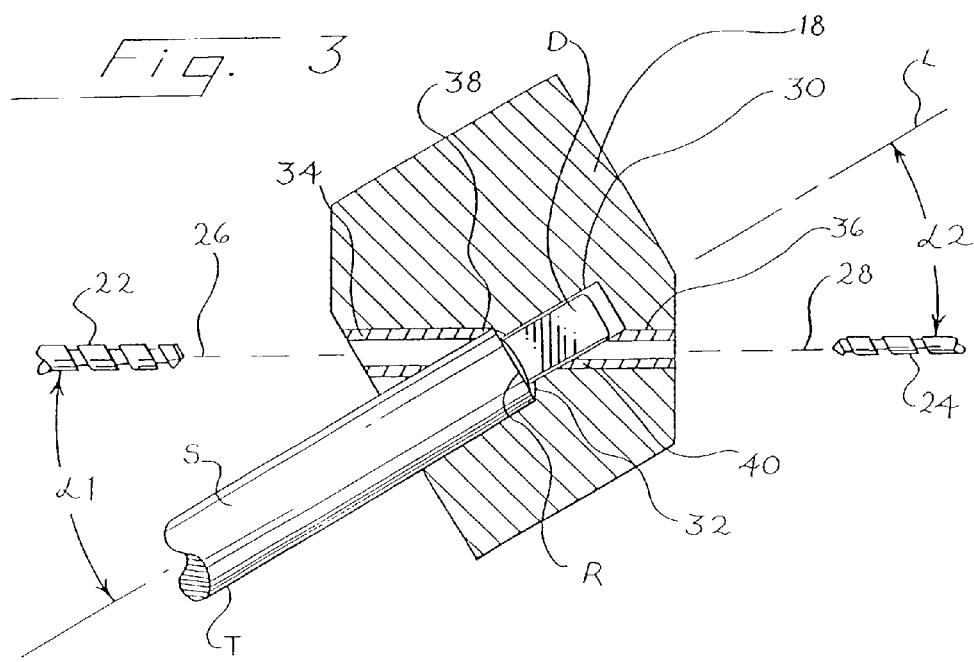
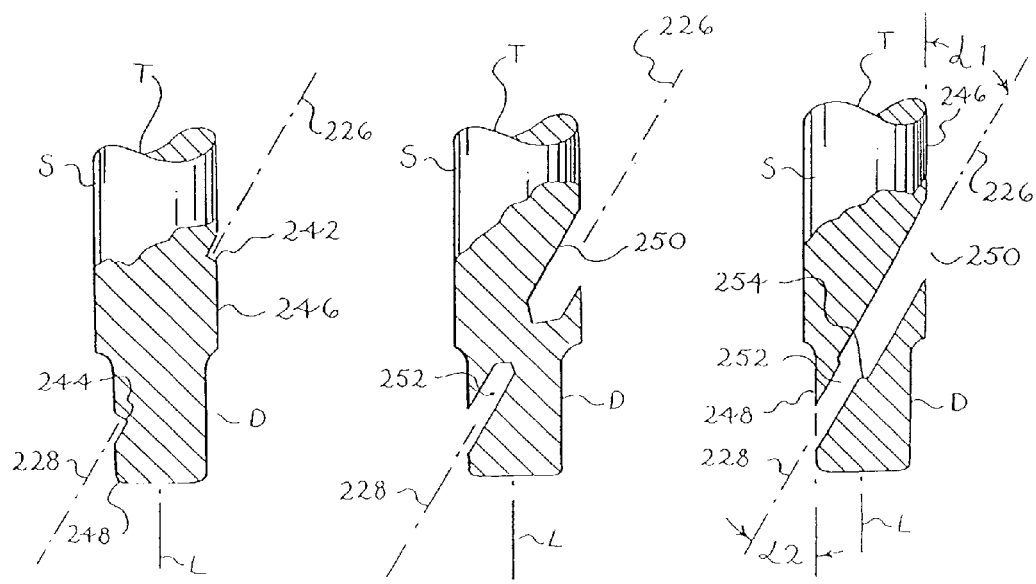

METHOD AND APPARATUS FOR REGISTERING A TORQUE-TRANSMITTING TOOL IN A FIXTURE FOR FORMING A DIAGONAL BORE IN THE TOOL

RELATED APPLICATIONS

This application is the National Stage of International Application No. PCT/US00/02541, filed Feb. 1, 2000, which claims the benefit of U.S. Provisional Application No. 60/120,789, filed Feb. 19, 1999.

BACKGROUND

The present invention relates to machining and registering methods well suited for use with torque-transmitting tools such as out-of-round drive studs.

U.S. Pat. No. 5,644,958, assigned to the assignee of the present invention, discloses a quick release mechanism for an extension bar suitable for use with a socket wrench. This quick release mechanism utilizes a diagonally-oriented, stepped bore formed in the drive stud of the extension bar.

The machining of such diagonal bores presents manufacturing difficulties. In particular, there is a need to register the drive stud reliably with respect to the drilling axis. Poor registration can result in misplaced machined surfaces, and is therefore to be avoided. Proper location of a diagonal bore is even more difficult, because the oblique orientation of such a bore can cause the bore to deviate from the desired drilling axis, either at the start of the bore or during the drilling operation. Furthermore, when a drill is passed completely through the drive stud on a diagonal axis, there is a tendency for the drill to break as it exits the drill stud. This tendency is especially great for a stepped bore, which requires a relatively smaller diameter portion at the front of the drill.

SUMMARY

The present invention is directed both to an improved system for registering a drive stud for machining, and to improved systems for forming a diagonal bore. The invention itself is defined by the following claims, and the following paragraphs of this section are intended as an introduction, not as a definition of the invention.

Preferred embodiments described below efficiently form a stepped bore in a drive stud by first registering the drive stud precisely with respect to a drilling axis with a fixture that engages the shoulder between the out-of-round, extreme end portion of the drive stud and the adjacent, shank portion of the drive stud. In some preferred embodiments, the stepped bore is drilled in two stages, using two drills of differing diameters that enter the drive stud from respective sides of the longitudinal axis. The bores formed by these drills meet in the interior of the drive stud to form the required step.

Other preferred embodiments form a first seating surface on the tool at a point of intersection between an exterior surface of the tool and a drilling axis that intersects this surface at an oblique angle. This seating surface is shaped to facilitate subsequent drilling operations. For example, the seating surface may be oriented substantially transverse to the drilling axis. This feature, along with the fixture described above, can be used in methods that form the diagonal bore exclusively from one side of the longitudinal axis.

BRIEF DESCRIPTION OF THE DRAWINGS

FIG. 1 is a plan view of a drilling system that incorporates a first preferred embodiment of this invention.

FIG. 2 is a side view of the drilling system of FIG. 1.

FIG. 3 is an enlarged cross-sectional view showing a fixture included in the drilling system of FIGS. 1 and 2.

FIGS. 6, 7 and 8 are partial cross-sectional views showing three stages in the formation of a diagonal bore.

DETAILED DESCRIPTION OF THE PREFERRED EMBODIMENTS

Figure 4:
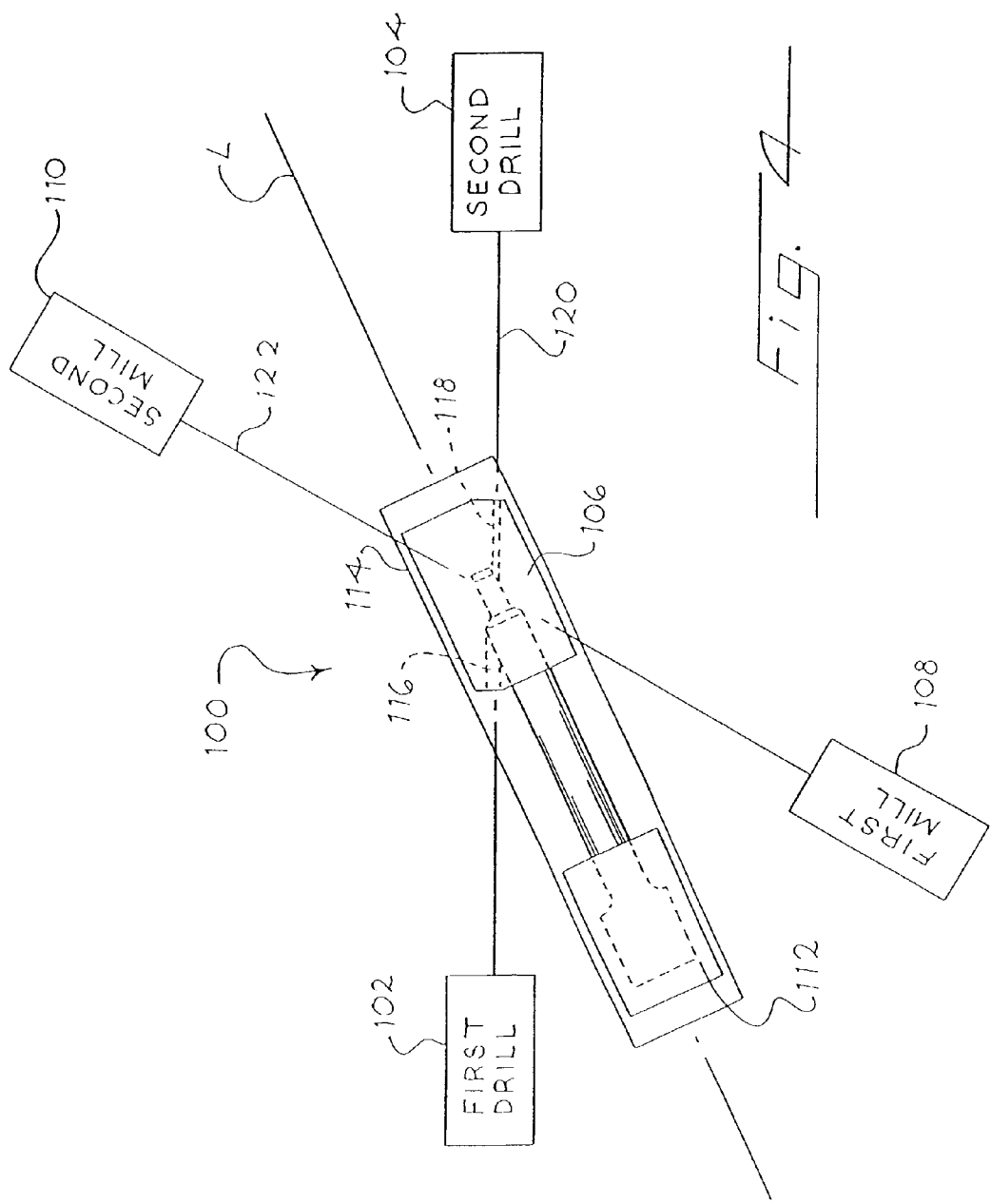
FIG. 4 is a plan view of a second preferred embodiment of the drilling system of this invention.

Turning now to FIGS. 1 and 2, a drilling system 10 incorporates a preferred embodiment of this invention. The drilling system 10 includes a table 12 that supports first and second drilling heads 14, 16, a fixture 18, and a clamp 20. The first and second drilling heads 14, 16 support first and second drills 22, 24 aligned with respective first and second drilling axes 26, 28. The first and second drilling heads 14, 16 are rotated in the conventional manner about the respective drilling axes 26, 28 by motors (not shown) and are moved axially along the respective drilling axes 26, 28 by respective air cylinders (not shown).

The clamp 20 supports a torque-transmitting tool T in the fixture 18 for machining.

FIG. 3 shows a cross-sectional view of the fixture 18 with the tool T clamped in place. As shown in FIG. 3, the tool T includes a drive stud that is made up of a shank portion S and an out-of-round drive portion D. In this embodiment, the shank portion S has a circular cross-section and the drive portion D has substantially a square cross-section. The transition between the shank S and the drive portion D comprises a shoulder R that defines a reference point at any desired point on the shoulder R.

The fixture 18 defines an out-of-round opening 30 that is shaped to receive the drive portion D, and a protruding element 32 that is shaped to engage the reference point on the shoulder R. Note that the opening 30 is deeper than the drive portion D is long such that the shoulder R registers the tool T with respect to the protruding element 32, and not the end of the drive portion D.

As shown in FIG. 3, the fixture 18 also supports first and second drilling bushings 34, 36. Each of the bushings 34, 36 is aligned with the respective drilling axis 26, 28 and is sized to receive closely and support the respective drill 22, 24. Preferably the bushings 34, 36 are formed of a hard material such as silicon carbide, and they are provided with oblique ends 38, 40 shaped to conform closely to the respective surfaces of the tool T and thereby to provide support for the respective drills 22, 24 to a position closely adjacent to the tool T.

FIG. 4 shows a drilling system 100 that incorporates a second preferred embodiment of this invention. The drilling system 100 is similar to the drilling system 10 in that it includes first and second drilling heads 102, 104 positioned as described above with respect to a fixture 106. The drilling heads 102, 104 and the fixture 106 can be identical to the drilling heads 14, 16 and the fixture 18 described above.

In addition, the drilling system 100 includes first and second milling heads 108, 110. The first and second drilling heads 102, 104 are arranged along a first line 120, and the first and second milling heads 108, 110 are arranged along a second line 122. In this embodiment, the lines 120, 122 intersect at an angle of about 60°.

The fixture 106 and the associated clamp 112 are mounted on a plate 114 that is rotatably mounted with respect to the remainder of the system 100. The plate 114 can be rotated about the longitudinal axis L of the tool T between two positions that are separated by an angle of 180°. In the first position, the drills of the first and second drilling heads 102, 104 are aligned with the bushings 116, 118, as shown in FIG. 4. In the second position (not shown), the mills of the first and second milling heads 108, 110 are aligned with the bushings 116, 118 (FIG. 4) FIG. 5 provides a flow chart of a milling method practiced by the system 100 of FIG. 4, and FIGS. 6–8 provide cross-sectional views of the tool T at three successive stages of the milling process.

Figure 5:
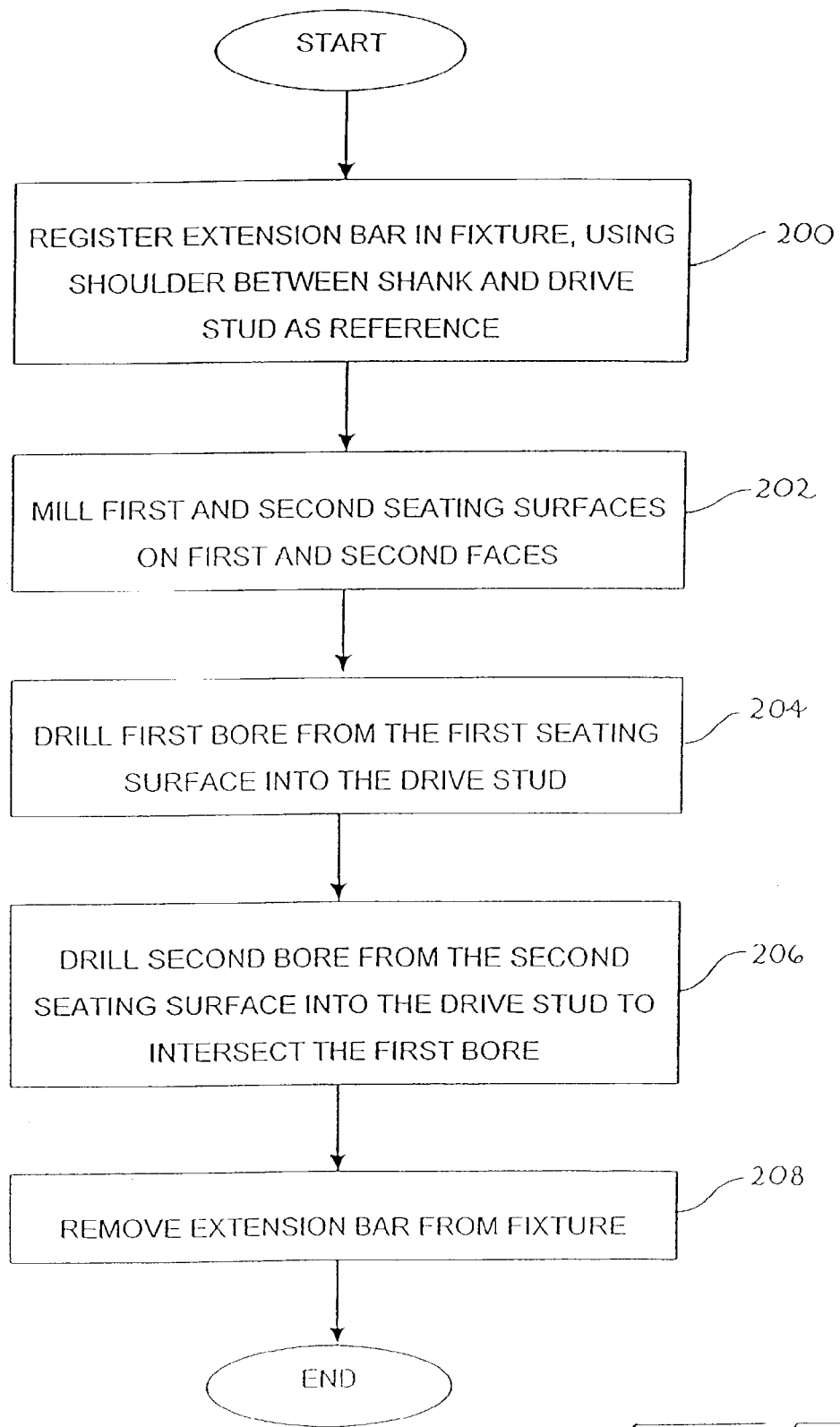
FIG. 5 is a block diagram of a method practiced by the drilling system of FIG. 4.

In block 200 of FIG. 5, the tool (an extension bar in this example) is registered in the fixture. As described above, the shoulder R between the shank S and the drive portion D is used as a reference point in order precisely to position the tool in the fixture. In block 202, first and second seating surfaces are milled on first and second surfaces of the drive stud. In FIG. 6, the first and second seating surfaces are indicated at 242 and 244, respectively. As shown in FIG. 6, the seating surfaces 242, 244 are formed in first and second surfaces 246, 248, respectively of the tool T. These surfaces 246, 248 are disposed on respective sides of the longitudinal axis L, and are parallel to one another in the view of FIG. 6. In this embodiment, the seating surfaces 242, 244 are formed by an end mill as planar surfaces oriented at right angles to the respective drilling axes 226, 228. After block 202 the plate 114 is indexed to bring the fixture bushings into alignment with the drilling heads.

In alternative embodiments the seating surfaces 242, 244 can be formed by machining operations along other axes, e.g. perpendicular to the surfaces 246, 248 or to the axes 226, 228. The seating surfaces 242, 244 may take many shapes. For example, they may be perpendicular to the axes 226, 228 at the point of intersection with the axes 226, 228, but otherwise curved (e.g. spherically concave or cylindrically concave), or they may form a corner that locates a drill. In all cases, the seating surfaces 242, 244 are shaped to reduce any tendency of the drill bit of a subsequent drilling operation to wander or skate away from the intended drilling axis, as compared with the original surfaces 246, 248. In some cases (e.g. the cylindrically curved or the corner surfaces described above), the seating surface will not be rotationally symmetrical about the drilling axis.

Continuing with FIG. 5, in block 204 a first bore is drilled from the first seating surface into the tool, and in block 206, a second bore is drilled from the second seating surface into the tool to intersect the first bore. FIG. 7 shows the tool T at an intermediate stage in the formation of the first and second bores 250, 252. Note that the first bore 250 has a larger diameter than the second bore 252, and that the respective drilling axes 226, 228 are co-linear. FIG. 8 shows the tool T at a later stage of manufacture, at which the bores 250, 252 have intersected to form a stepped bore that extends completely through the tool T and defines a shoulder 254. Preferably, the first and second bores 250, 252 are drilled in a manner such that the drilling operations overlap in time to reduce the total time required to form the stepped bore. As shown in FIG. 8, the angle α1 between the first surface 246 and the first drilling axis 26 is equal to the angle α2 between the second surface 248 and the second drilling axis 28. The angles α1 and α2 are both oblique angles. If desired, either bore 250, 252 can be drilled before the other.

Continuing with FIG. 5, the extension bar is then removed from the fixture in block 208.

Figure 9:
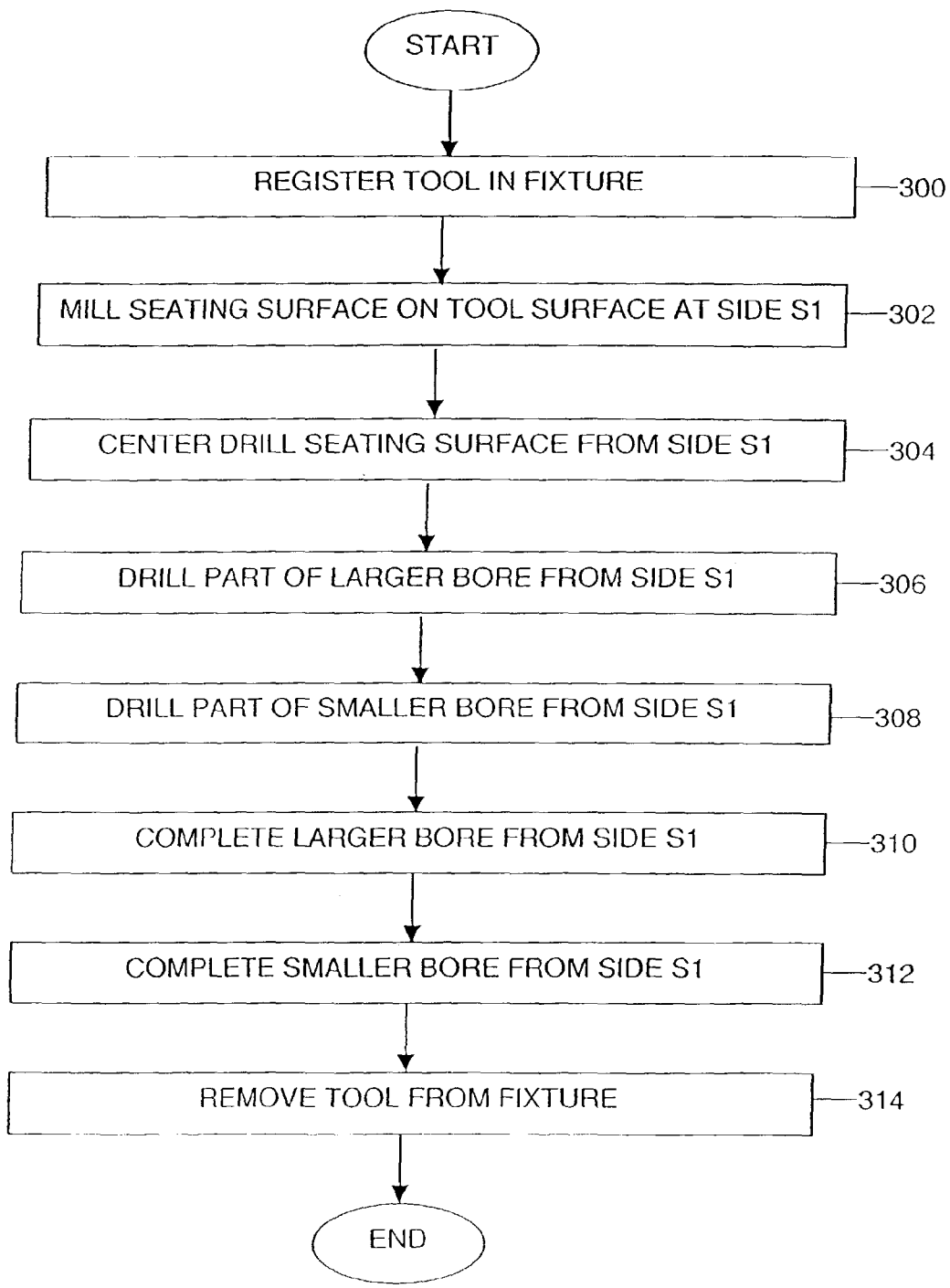
FIG. 9 is a block diagram of a method of another embodiment of this invention.

FIG. 9 relates to another preferred method of this invention. The method of FIG. 9 can be used to drill a stepped bore similar to the bore shown in FIG. 8, but in the method of FIG. 9 all drilling and milling operations proceed from only a single side of the tool being formed.

As shown in block 300 of FIG. 9, a tool is first registered in a fixture. The tool can be the tool T described above, and the fixture may be identical to the fixture shown in FIG. 3. However, since all drilling operations proceed from a single side of the tool, the bushing 36 is not needed. As described above, the shoulder between the drive portion D and the shank S provides a preferred registration surface for the fixture.

Next, at 302, a seating surface is milled on an exterior surface of the tool from side S1. The seating surface may be substantially identical to the seating surface 242 of FIG. 6, and the side S1 may be the surface 246 of FIG. 6. At 304, the seating surface is then center drilled from side S1. A center drilling operation forms a small conical recess in the seating surface to assist in centering a drill in subsequent drilling operations.

Because the seating surface formed at 302 in this example is substantially transverse to the drilling axis of the center drill of 304, the center drill of 304 consistently and reliably forms the center drill recess at the desired intersection of the drilling axis and the seating surface. The drilling axis may be oriented as shown at 226 in FIG. 6, and the center drill recess is formed at the intersection of the drilling axis 226 and the seating surface 242.

At 306, a larger diameter drill is used to drill part of the larger bore from side S1. This drill is centered by the center drill recess formed at 304. Next, at 308, a smaller diameter drill is used to form part of the smaller bore, again proceeding from side S1 along the drilling axis. At 310, the larger bore is completed from side S1 with a drill of the same diameter as that used at 306. At 312, a smaller drill is used to complete formation of the smaller bore from side S1. The drill used at 312 is the same diameter as that used at 308. Finally, at 314, the tool is removed from the fixture. If desired, a step drill may optionally be used between blocks 312 and 314 to provide the final finish and shape to the step between the larger and smaller bores.

The method of FIG. 9 can be implemented using a conventional, numerically controlled, indexed milling machine and the tool registration fixture described above. The registration fixture provides all of the advantages described in conjunction with the first and second embodiments, and the seating surface assists in properly locating the center drill recess.

It should be apparent from the foregoing discussion that the drilling systems described above precisely register the tool using the shoulder between the out-of-round drive portion and the shank portion of the drive stud. The drilling system 10 operates similarly to the drilling system 100, except that no seating surfaces 242, 244 are formed. The methods described above in conjunction with the systems 10, 100 can readily be automated in quick and reliable systems that provide little tool breakage since the drills are well-supported to a point closely adjacent the tool, and the drills are never caused to exit the tool at an oblique angle. By using the seating surfaces 242, 244, consistent results can be achieved using a preferably substantially constant speed of drill advance. The registration techniques described above may be used separately from the drilling techniques, and vice-versa.

The widest variety of machine tools and mechanisms for controlling the movement of these machine tools can be used. For example, pneumatic, hydraulic, and electric power systems can be used. Conventional numerically controlled machine tool techniques can be used to automate the methods described above. In alternative embodiments of this invention, either the machine tools can be moved along any suitable direction to bring successive machine tools into alignment with the drilling axes, or the fixture can be moved along any suitable direction to achieve a similar result. Any suitable combination of rotational and/or translational movements can be used. This invention is not limited to use with the specific machine tools or the specific workpieces described above.

As used herein, the term "drive stud" is intended broadly to encompass the out-of-round portion and adjacent portions of a torque transmitting tool at intermediate stages of manufacture.

The term "oblique" is intended broadly to encompass acute angles between 0 and 90 degrees.

The term "to machine" is intended broadly to encompass any material removal method including drilling, milling, turning, grinding and electrical discharge machining, for example.

The term "machine tool" is intended broadly to encompass any tool for machining as defined above.

The term "operative position" is intended to refer to a relative position between a machine tool and a workpiece that orients the machine tool to a desired alignment with the workpiece. The operative position can be achieved by moving either the machine tool, or the fixture in which the workpiece is registered, or both to achieve the desired alignment.

The term "machined surface" is intended broadly to encompass a surface formed by any machining activity or any machine tool, including those described above.

The term "reference surface" is intended broadly to encompass a point-like surface, a line-like surface, or a surface that extends substantially in two or three dimensions.

The term "shoulder" is intended broadly as applied to a tool to encompass any part of the transitional surface between the shank portion and the drive portion of the tool, including but not limited to portions of the transitional surface immediately adjacent to the shank portion and the drive portion.

The term "fixture" is intended broadly to encompass one or more elements that stabilize the workpiece in the desired orientation. A fixture may include multiple discrete elements that are separately mounted to a reference element, and the fixture may contact the workpiece at only a few discrete points rather than receiving the workpiece as illustrated. There is no requirement that a fixture include drill bushings as shown, whether or not drill bushings are used. In some embodiments, the fixture may register a tool without physical contact with a reference surface of the tool, as for example when the position of the reference surface is sensed optically rather than by physical contact.

The foregoing detailed description has described only a few of the many forms that this invention can take. For this reason, this detailed description is intended only by way of illustration, and not by way of limitation. It is only the following claims, including all equivalents, that are intended to define the scope of this invention.

The invention claimed is:

1. A method for forming a diagonal bore in a torque-transmitting tool comprising a longitudinal axis and first and second surfaces on different sides of the longitudinal axis, said method comprising:
    (a) forming a first part of a first, larger bore in the tool from the first surface along a first drilling axis, said first drilling axis intersecting the first surface at a first oblique angle;
    (b) forming a first part of a second, smaller bore in the tool from the first surface along the first drilling axis;
    (c) forming a second part of the first, larger bore in the tool from the first surface along the first drilling axis; and
    (d) forming a second part of the second, smaller bore in the tool from the first surface along the first drilling axis, said second part of the second, smaller bore passing through the second surface at a second oblique angle.

2. The method of claim 1 wherein different drills are used in (a) and (c) and different drills are used in (b) and (d).

3. The method of claim 1 wherein (a) is performed before (c), wherein (b) is performed before (d), and wherein (a) is performed before (d).

4. A method for forming a diagonal bore in a torque-transmitting tool comprising a longitudinal axis and first and second surfaces on different sides of the longitudinal axis, said method comprising:
    (a) drilling a first bore in the tool from the first surface along a first drilling axis, said first drilling axis intersecting the first surface at a first oblique angle; and
    (b) drilling a second bore in the tool from the second surface along a second drilling axis, said second drilling axis intersecting the second surface at a second oblique angle, said first and second drilling axes oriented such that the first and second bores meet in the tool;
    wherein drilling operations of (a) and (b) overlap in time.

5. A system for machining a diagonal bore in a drive stud of a torque-transmitting tool, said system comprising:
    a tool comprising a longitudinal axis, first and second surfaces on different sides of the longitudinal axis, a shank, and a shoulder between the shank and at least one surface of the drive stud;
    a fixture configured to hold the tool in a selected position;
    a first drill oriented with respect to the fixture when in an operative position to drill a first bore in the tool from the first surface along a first drilling axis, said first drilling axis intersecting the first surface at a first oblique angle; and
    a second drill oriented with respect to the fixture when in an operative position to drill a second bore in the tool from the second surface along a second drilling axis, said second drilling axis intersecting the second surface at a second oblique angle, said first and second drilling axes oriented such that the first and second bores meet in the tool;
    wherein the fixture is configured to engage the drive stud and to use the shoulder to register the tool with respect to the fixture and the drills.

6. A system for machining a diagonal bore in a drive stud of a torque-transmitting tool, said system comprising:
    a tool comprising a longitudinal axis and first and second surfaces on different sides of the longitudinal axis;
    a fixture configured to hold the tool in a selected position;
    a first drill oriented with respect to the fixture when in an operative position to drill a first bore in the tool from the first surface along a first drilling axis, said first drilling axis intersecting the first surface at a first oblique angle; and a second drill oriented with respect to the fixture when in an operative position to drill a second bore in the tool from the second surface along a second drilling axis, said second drilling axis intersecting the second surface at a second oblique angle, said first and second drilling axes oriented such that the first and second bores meet in the tool;

wherein the fixture comprises a first drill bushing positioned closely adjacent the first surface and aligned with the first drilling axis to support the first drill, and wherein the first drill bushing comprises an oblique end substantially aligned with the first surface.

7. A system for machining a diagonal bore in a drive stud of a torque transmitting tool, said system comprising:

a tool comprising a longitudinal axis and first and second surfaces on different sides of the longitudinal axis;

a fixture configured to hold the tool in a selected position;

a first drill oriented with respect to the fixture when in an operative position to drill a first bore in the tool from the first surface along a first drilling axis, said first drilling axis intersecting the first surface at a first oblique angle; and a second drill oriented with respect to the fixture when in an operative position to drill a second bore in the tool from the second surface along a second drilling axis, said second drilling axis intersecting the second surface at a second oblique angle, said first and second drilling axes oriented such that the first and second bores meet in the tool;

wherein the fixture comprises a first drill bushing positioned closely adjacent the first surface and aligned with the first drilling axis to support the first drill, and a second drill bushing positioned closely adjacent the second surface and aligned with the second drilling axis to support the second drill; and wherein the second drill bushing comprises an oblique end substantially aligned with the second surface.

8. A method for forming a diagonal bore in a torque-transmitting tool comprising a longitudinal axis and first and second surfaces on different sides of the longitudinal axis, said method comprising:

(a) drilling a first bore in the tool from the first surface along a first drilling axis, said first drilling axis intersecting the first surface at a first oblique angle; and (b) drilling a second, smaller bore in the tool from the first surface along the first drilling axis, said second bore forming with the first bore a step within the tool, said second bore passing through the second surface at a second oblique angle;

wherein (a) comprises drilling the first bore in two drilling operations.

9. The method of claim 8 wherein (a) comprises drilling the first bore with two separate drills in said two drilling operations.

10. The method of claim 8 or 9 wherein at least part of the second, smaller bore of (b) is drilled between said two drilling operations.

11. A method for forming a diagonal bore in a torque-transmitting tool comprising a longitudinal axis and first and second surfaces on different sides of the longitudinal axis, said method comprising:

(a) drilling a first bore in the tool from the first surface along a first drilling axis, said first drilling axis intersecting the first surface at a first oblique angle; and (b) drilling a second, smaller bore in the tool from the first surface along the first drilling axis, said second bore forming with the first bore a step within the tool, said second bore passing through the second surface at a second oblique angle;

wherein (b) comprises drilling the second, smaller bore in two drilling operations.

12. The method of claim 8 wherein (b) comprises drilling the second smaller bore with two separate drills in said two drilling operations.

* * * * *